United States Patent
Hogan et al.

(10) Patent No.: US 10,152,470 B2
(45) Date of Patent: Dec. 11, 2018

(54) UPDATING FORMULAS IN RESPONSE TO TABLE TRANSPOSITION

(71) Applicant: Apple Inc., Cupertino, CA (US)

(72) Inventors: Edward Patrick Hogan, Pittsburgh, PA (US); Jonathan Robert Speicher, Pittsburgh, PA (US); Matthew Ross Lehrian, Pittsburgh, PA (US); Michael Jeremy Coblenz, Sunnyvale, CA (US); Ryan M. Olshavsky, San Jose, CA (US); Shawn Patrick Flisakowski, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 14/511,761

(22) Filed: Oct. 10, 2014

(65) Prior Publication Data

US 2016/0103819 A1 Apr. 14, 2016

(51) Int. Cl.
*G06F 17/24* (2006.01)
*G06F 17/21* (2006.01)

(52) U.S. Cl.
CPC .......... *G06F 17/246* (2013.01); *G06F 17/245* (2013.01)

(58) Field of Classification Search
CPC .... G06F 17/246; G06F 17/245; G06F 17/211; G06F 17/212
See application file for complete search history.

(56) References Cited

U.S. PATENT DOCUMENTS

| | | | |
|---|---|---|---|
| 6,298,342 B1 | 10/2001 | Graefe | |
| 7,614,006 B2 | 11/2009 | Molander | |
| 2002/0089526 A1* | 7/2002 | Buxton | G06F 8/38 715/700 |
| 2006/0184889 A1* | 8/2006 | Molander | G06F 17/246 715/764 |
| 2007/0118510 A1 | 5/2007 | Li | |
| 2007/0136666 A1* | 6/2007 | Khen | G06F 17/246 715/217 |
| 2010/0017363 A1* | 1/2010 | Bellamkonda | G06F 17/30463 707/E17.014 |
| 2010/0083080 A1* | 4/2010 | Rapp | G06F 17/246 715/212 |
| 2013/0124956 A1* | 5/2013 | Hatfield | G06F 17/2288 715/211 |
| 2013/0124967 A1* | 5/2013 | Hatfield | H04L 51/16 715/232 |
| 2014/0372858 A1* | 12/2014 | Campbell | G06F 17/246 715/220 |

(Continued)

OTHER PUBLICATIONS

JELEN Transposing Formulas, Published Jan. 2009 by YOUTUBE, pp. 1-8.*

(Continued)

*Primary Examiner* — Stephen Hong
*Assistant Examiner* — Ahamed I Nazar
(74) *Attorney, Agent, or Firm* — Fletcher Yoder PC

(57) ABSTRACT

Embodiments are disclosed in which an algorithm that updates or rewrites one or more formulas when a table is transposed in an application. In certain embodiments the formula is rewritten so as to preserve the functionality of the formula with respect to the transposed table. In certain embodiments, a notification may be provided that a formula is changed or not changed in response to the table transposition event.

25 Claims, 11 Drawing Sheets

(56) References Cited

U.S. PATENT DOCUMENTS

2015/0193422 A1* 7/2015 Cudak .................. G06F 17/246
 715/219
2016/0103819 A1* 4/2016 Hogan .................. G06F 17/246
 715/217

OTHER PUBLICATIONS

Rocks, Two Ways to Transpose Excel Data, published May 25, 2011 by YouTube, pp. 1-6.*
Rocks, Two Ways to Transpose Excel Data, published May 25, 2011 by YouTube, pp. 1-7.*

* cited by examiner

FIG. 11

| | A | B | C | D | E | F | G |
|---|---|---|---|---|---|---|---|
| | | | TABLE 1 | | | | |
| | | APPLES | FIDDLEHEADS | KALE | KOHLRABI | RAMPS | |
| 2014 | | 250 | 315 | 225 | 485 | 750 | 2025 |
| 2015 | | 210 | 590 | 400 | 520 | 630 | 2350 |

THE FORMULA WAS UPDATED BECAUSE IT REFERS TO A TABLE THAT WAS TRANSPOSED. ORIGINAL FORMULA: SUM(C) — 310

UPDATING FORMULAS IN RESPONSE TO TABLE TRANSPOSITION

BACKGROUND

The present disclosure relates generally to updating formulas within a table of an application, such as a spreadsheet application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Spreadsheet applications, as well as other types of applications, may use rows and columns of cells (such as arrays or tables of such cells) in which a user enters or manipulates data for calculation or presentation. Tables of cells used in such applications may range from a limited number of cells in simple or straightforward implementations to much larger arrays of cells in more complex scenarios.

Often an application may allow a user to define a formula within a cell that references other cells within a spreadsheet or table. For example, a formula entered into a cell of a table may reference other cells of that table or of other tables for values that are used, evaluated, or manipulated by the formula in question. For example, one cell may contain a formula for adding or otherwise mathematically manipulating a set of values that are defined in other cells of a spreadsheet.

One consequence of such cell referencing is that a change to the respective table containing the referenced cells may have an inadvertent impact on a referencing formula. For example, changes affecting the layout or arrangement of an array of cells (such as movement or transposition of a range of cells) may result in formulas no longer referencing the cells intended by the user. As a result, changes to a given range of cells, such as due to transposition of the range, may inadvertently render one or more formulas incorrect if those formulas reference the cells in question.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments are discussed and described that facilitate the updating or rewriting of formulas that reference cells within a table or tables. In one implementation, the formulas are updated in response to a change made to the table containing the referenced cells, such as the transposition of such a table. In one such example, the entire table is transposed (as opposed to only a subset or range of selected cells being transposed within a larger or infinite table) and formulas that reference cells within the transposed table are updated based upon the transposition. In certain embodiments, only certain types of formulas are updated while other types of formulas are not updated. In such embodiments, a notification may be displayed proximate to some or all of the formulas to indicate that the formula was updated or was not updated and to thereby place a user on notice that a change has occurred that might affect the accuracy of formula in question.

BRIEF DESCRIPTION OF THE DRAWINGS

Various aspects of this disclosure may be better understood upon reading the following detailed description and upon reference to the drawings in which:

FIG. 11 depicts the display of a warning or notice in response to the formula update process, in accordance with aspects of the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed to resolving issues that may arise in formulas (such as formulas used to implement one or more defined functions) within a table when cells referenced by the formulas are involved in a transpose operation. In certain embodiments, certain of the formulas in question are updated or rewritten to reflect the new position or arrangement of the transposed referenced cells. Further in certain embodiments, a notification may be displayed to place a user on notice that a given formula was or was not updated in response to the transpose operation. In addition, in certain implementations, the entire table undergoes the transpose operation, as opposed to a limited subset or range of cells selected from a larger table.

Figure 1:
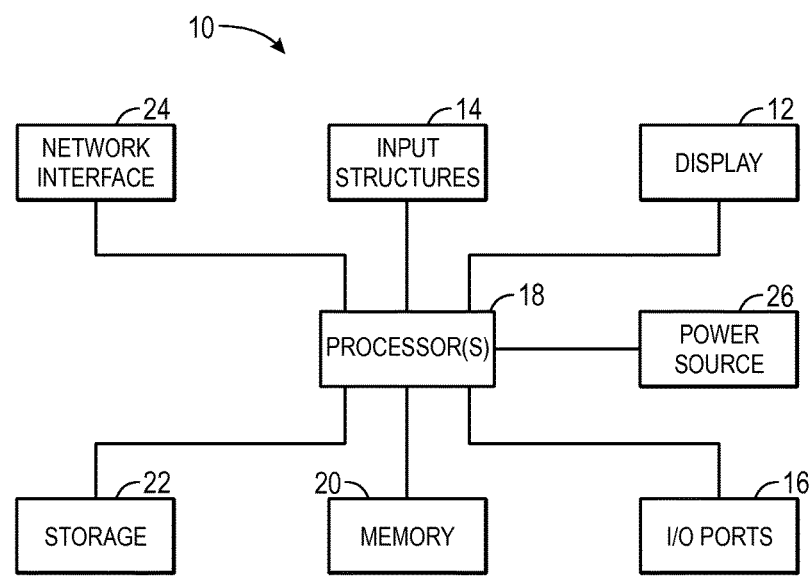
FIG. 1 is a block diagram of an electronic device that may use the techniques disclosed herein, in accordance with aspects of the present disclosure.
Figure 2:
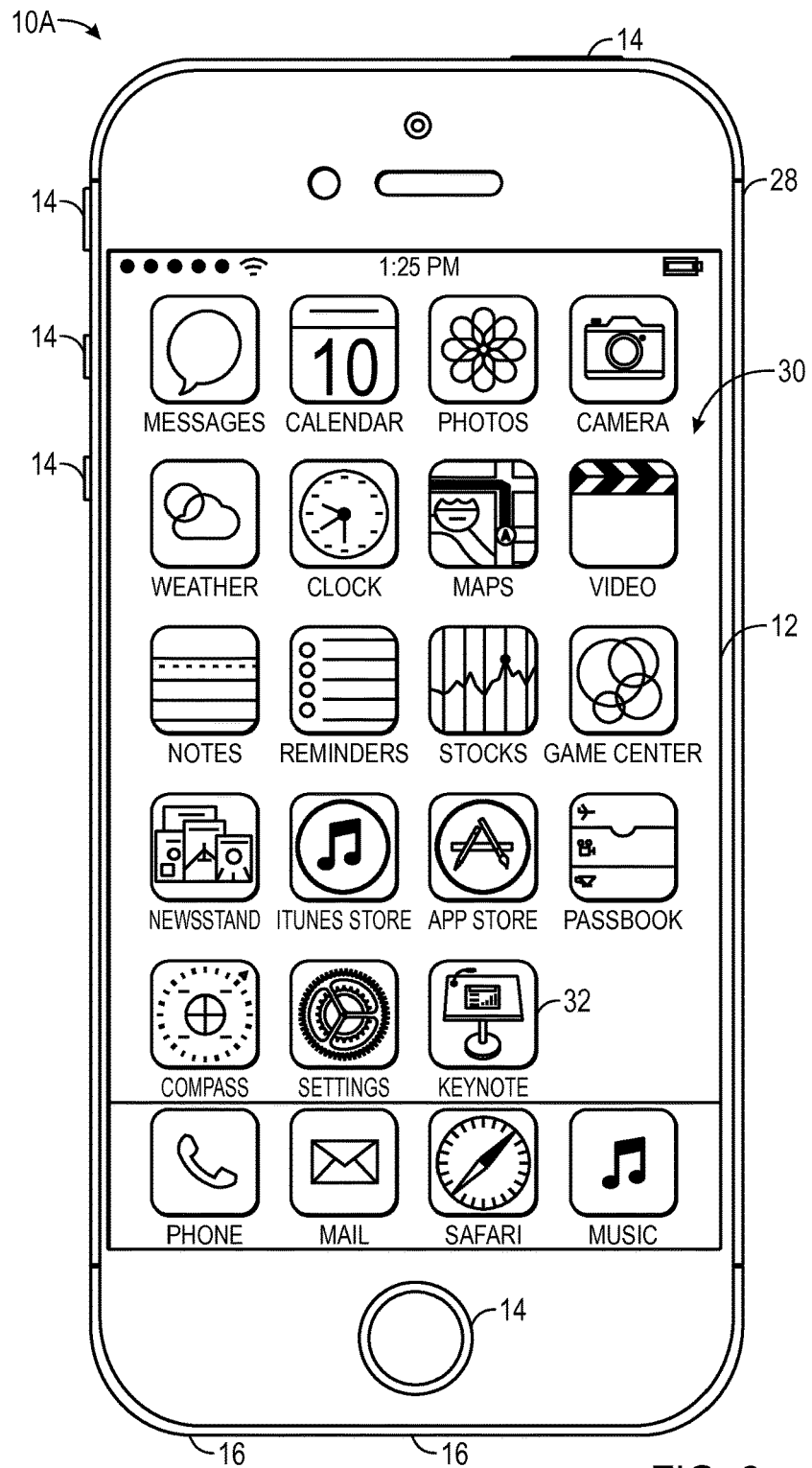
FIG. 2 is a front view of a handheld device, such as an iPhone® by Apple Inc., representing an example of the electronic device of FIG. 1.
Figure 3:
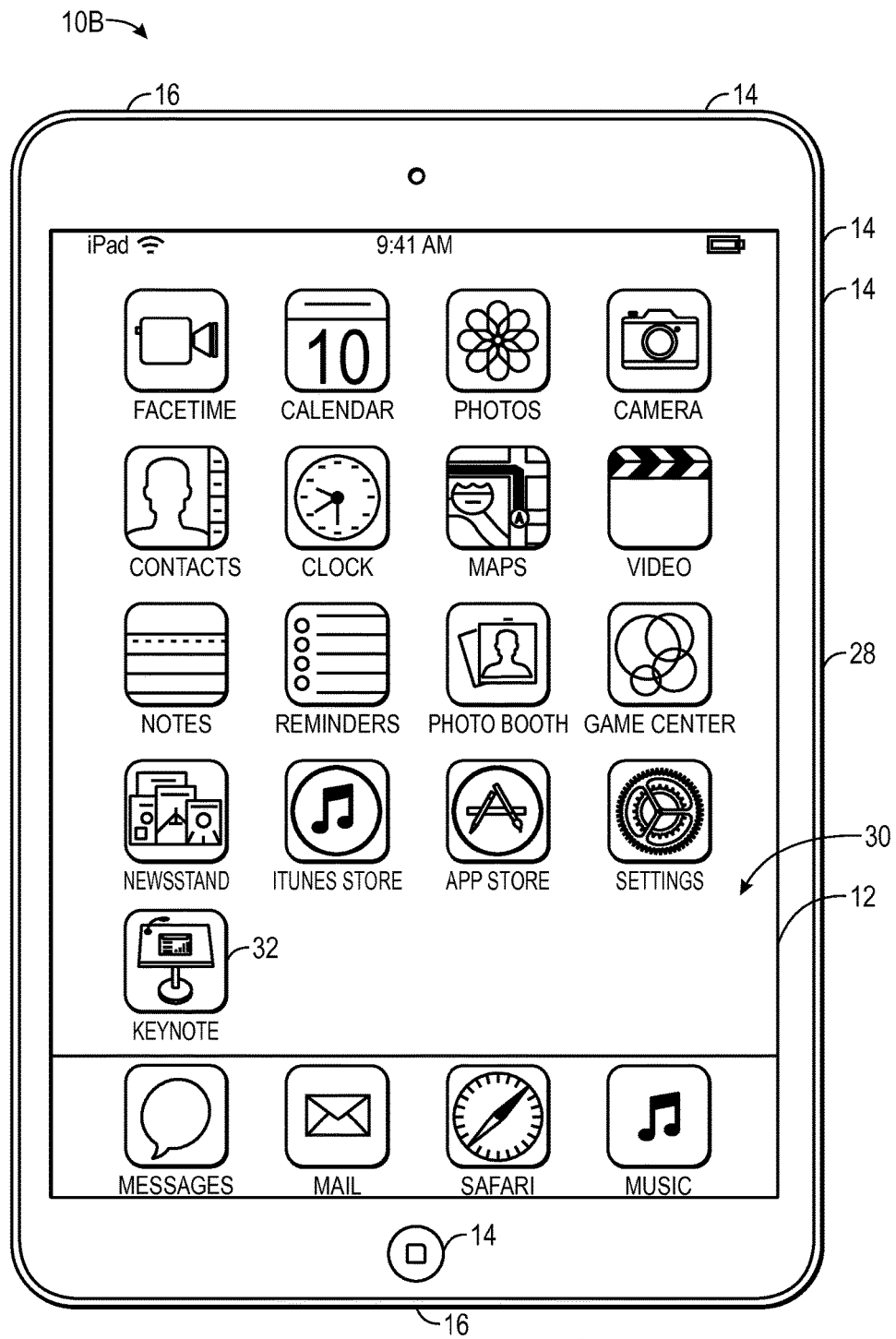
FIG. 3 is a front view of a tablet device, such as an iPad® by Apple Inc., representing an example of the electronic device of FIG. 1.
Figure 4:
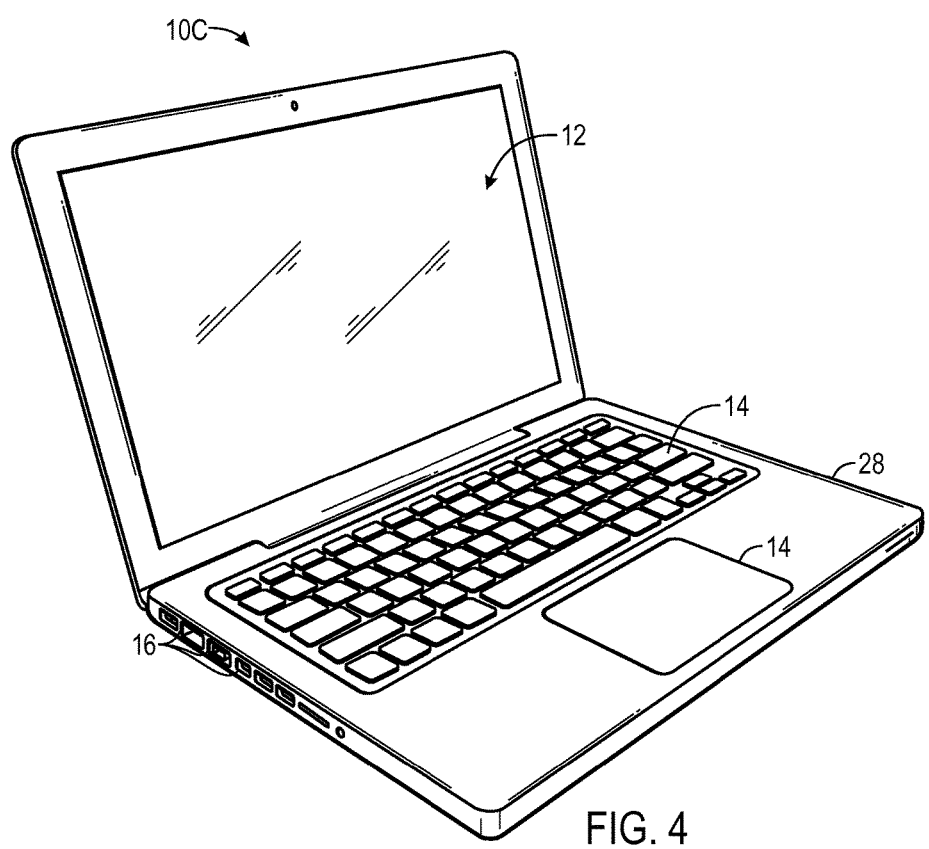
FIG. 4 is a perspective view of a notebook computer, such as a MacBook Pro® by Apple Inc., representing an example of the electronic device of FIG. 1.

A variety of suitable electronic devices may employ the techniques described herein when executing or interacting with a spreadsheet application or other application employing cells or tables of such cells. FIG. 1, for example, is a block diagram depicting various components that may be present in a suitable electronic device 10 that may be used in the implementation of the present approaches. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor (s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Numbers® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a spreadsheet application program (e.g., Numbers® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the spreadsheet application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Numbers® by Apple Inc.) running on the computer 10C.

With the preceding in mind, a variety of computer program products, such as applications or operating systems, may use or implement the techniques discussed below to enhance the user experience on the electronic device 10 and to improve the performance of the device when executing an application encoded as discussed herein. Indeed, any suitable computer program product that provides for the use or manipulation of cells within a table or spreadsheet, including the referencing of other cells from a given cell, may employ and benefit from some or all of the techniques discussed below. For instance, the electronic device 10 may store and run a spreadsheet application 34 (e.g., Numbers® from Apple Inc.). The spreadsheet application may be stored as one or more executable routines (which may encode and implement the actions described below) in memory and/or storage (FIG. 1). These routines, when executed, may cause control codes and logic as discussed herein to be implemented and may cause screens as discussed herein to be displayed on a screen of the electronic device or in communication with the electronic device.

Figure 5:
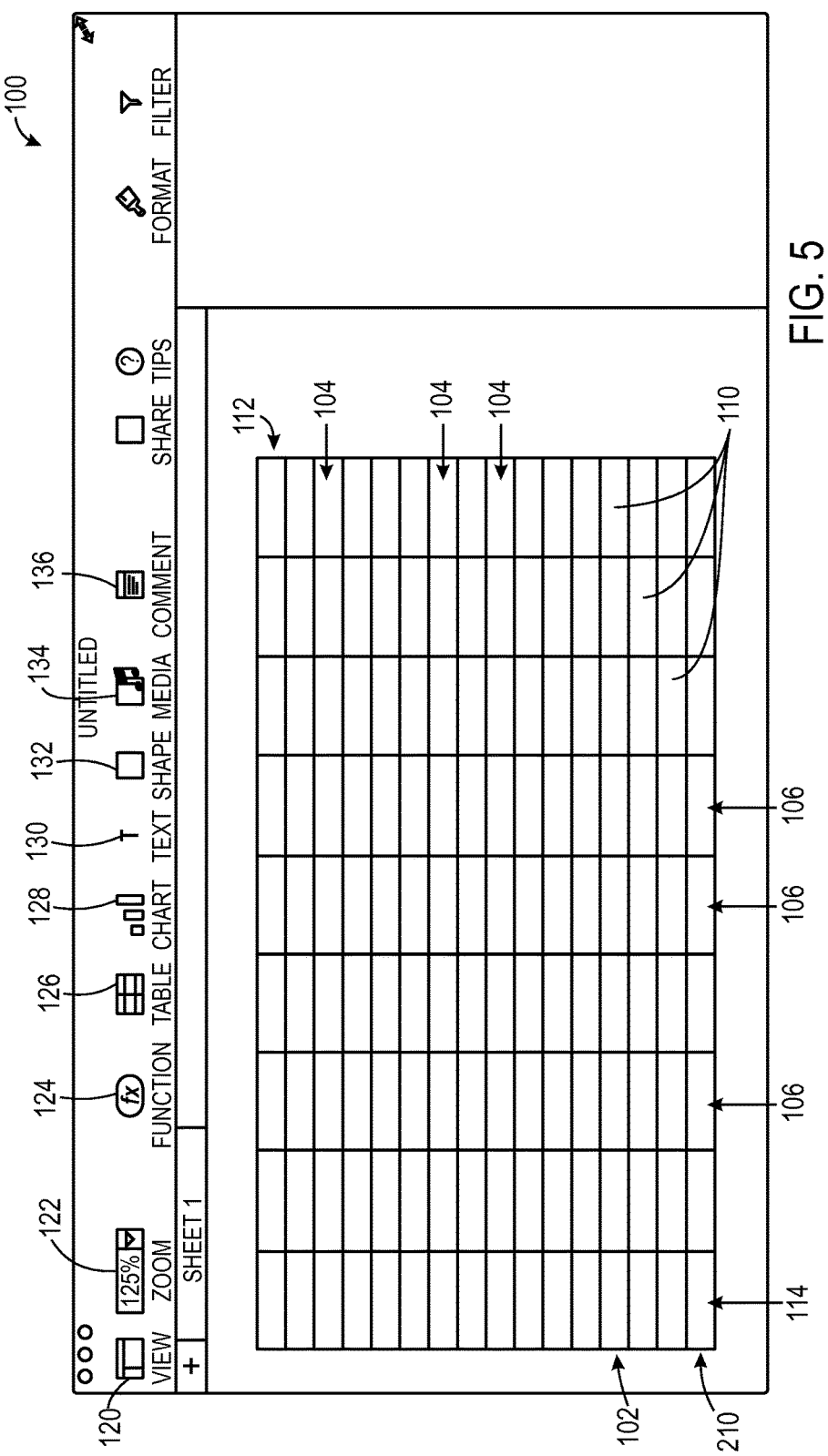
FIG. 5 illustrates an example of a screen of a spreadsheet application in accordance with aspects of the present disclosure.

Turning to FIG. 5, an example of a spreadsheet application interface screen 100 is depicted which includes a table 102 having rows 104 and columns 106 of cells 110. In the depicted example, the table 102 is of finite size and displayed as an object (e.g., a graphical object) on the canvas 108 provided by the application. That is, the table 102 is not an "infinite" table composed of rows and columns of cells that fill the entire application display area in both horizontal and vertical dimensions. Such "infinite" table contexts provide an essentially limitless array of cells, though in such contexts there may in fact be a maximum number of rows and columns, this maximum number generally greatly exceeds any real world application or table size. Thus, in contrast to such "infinite" tables, the table 102 is of a limited, finite size and is handled as a table object on the canvas 108 provided by the application. Thus, in such an embodiment, more than one separate and distinct table object 102 may be provided or displayed on the canvas 108.

Upon selection of a cell 110 within the table 102, a user may be provided a prompt or other entry box by which text, numbers, formula, and so forth may be entered as the contents of a cell 110 or by which the existing contents of a cell 110 may be edited or modified. In the depicted example, the uppermost row 112 and leftmost column 114 may be set aside or visually distinguished to allow this row and column to display row or column headings or labels. Further, row and column address indicators or indexes may also be displayed that may be automatically populated with an index of column addresses or headers (e.g., A, B, C, D, and so forth) or, respectively, with an index of row addresses or headers (e.g., 1, 2, 3, 4, and so forth). In this manner an addressing scheme may be provided for each cell 110 within the table 102 such that individual cells may be identified by column and row address (e.g., A1, B3, D30, and so forth).

In addition, the interface screen 100 may include an interface bar 120 that includes buttons, menus, drop down boxes, and so forth that a user may interact with to invoke various functions within the spreadsheet application. By way of example, in the depicted screen 100, a magnification control 122, function entry button 124, table button 126, chart button 128, text box button 130, shape button 132, media button 134, and comment button 136 are provided. By interacting with these various controls, the user may insert a new table object 102 (such as via selection of the table button 126) on the displayed canvas area 108, select a function for use in a cell (such as via selection of the function button 124), insert a comment (such as via selection of the comment button 136), and so forth).

As discussed above, in certain instances a cell 110 within a table 102 may contain a function defined by a formula that references other cells in the table 102 or in other table objects present on the canvas 108 or in other spreadsheets. Examples of such formulas include mathematical formulas (such as formulas to determine a sum or difference over a range of cells) and statistical formulas (such as formulas to determine an average, median, maximum, minimum, or mode, over a range of cells). Similarly, such formulas may also include formulas related to the layout, searching, referencing, or redirection of the contents of a cell for various display or calculation purposes.

In practice, the referenced cells 110 may be moved or rearranged by various operations applied to the table 102. By way of example, a user may provide an instruction to the application to transpose the table 102 (i.e., to interchange the rows and columns) such that column A and row 1 are swapped, column B and row 2 are swapped, and so forth. In certain embodiments and examples discussed herein, the entire table 102 is transposed in response to such an instruction. This is in contrast to contexts where only a selection or limited range of cells within a table (e.g., an "infinite" table) is transposed while non-selected cells remain in their original orientation.

As discussed herein, in one implementation, in response to such a cell rearrangement operation (e.g., a transposition of the table 102), some or all of the formulas that reference cells within the transposed table are updated or rewritten to reflect the new position or address of the referenced cells or range of cells. The formulas containing the cell reference may be located within the table object that is transposed or within a different table object or chart object, such as in a separate table or chart also displayed on the canvas.

Figure 6:
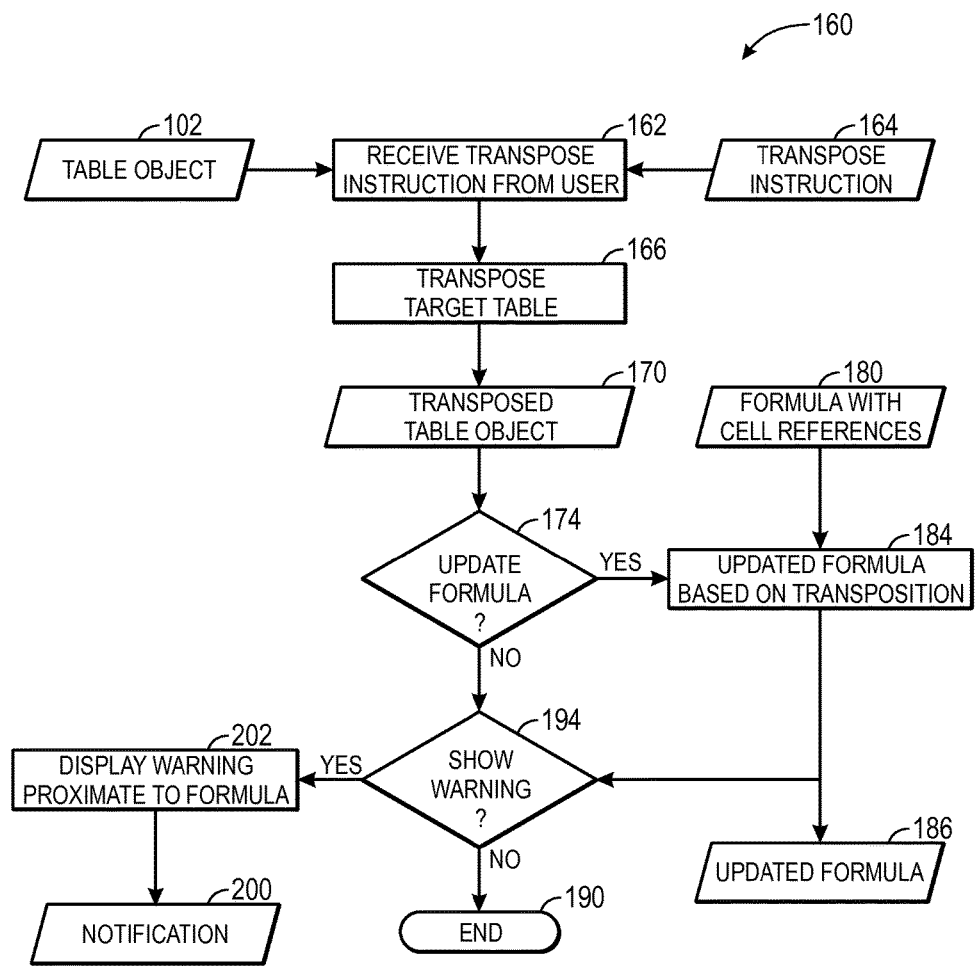
FIG. 6 depicts a process flow depicting control logic for updating a formula, in accordance with aspects of the present disclosure.

With the preceding in mind, and to facilitate explanation, an example of an algorithm is illustrated in FIG. 6 in the form of a process or control flow diagram 160. In this example, a table object 102 may be initially present or displayed on an application (e.g., spreadsheet) canvas 108. As previously described, the table object 102 may include a limited number of rows 104 and columns 106 of cells 110. Some or all of the cells 110 of the table 102 may be populated by numeric values, text entries, or formulas that may be solved by the logic of the application when running Such formulas may be self contained (i.e., may reference only arguments and values provided within the formula itself) or may reference the contents of other cells 110 of the table 102 or of other tables. A simple example of one such table 102 is shown below, with respective cell addresses shown in brackets { }:

TABLE

|   | A | B | C |
|---|---|---|---|
| 1 | {A1} | {B1} | {C1} |
| 2 | {A2} | {B2} | {C2} |

In the depicted example, the application receives (block 162) an instruction 164 from a user to transpose (block 166) the table 102. As discussed herein, in certain embodiments such a transposition operation may be applied to the entire table object 102, as opposed a set or range of cells selected by the user for transposition. In such an embodiment, a transposed table object 170 is the result of the transposition operation. The rows 104 and columns 106 of the transposed table object 170 correspond, respectively, to the columns 106 and rows 104 of the table object 102. In the present example, the initial table 102 reproduced above may be rotated from being a 3×2 table to being a 2×3 table, with rows 104 and columns 106 being interchanged, as shown below. In this example, the initial addressing of the un-transposed table, shown in brackets, is reproduced in the transposed cells to illustrate the discontinuity in position and address that may occur as a result of the transpose operation:

| | Transposed Table | |
|---|---|---|
| | A | B |
| 1 | {A1} | {A2} |
| 2 | {B1} | {B2} |
| 3 | {C1} | {C2} |

Thus, as can be seen in this example, the cells initially corresponding to column A in the initial table 102 correspond to row 1 of the transposed table 170. Conversely, the cells initially corresponding to row 1 in the initial table 102 correspond to column A of the transposed table 170. While some cells remain at their original location (e.g., the cells at addresses A1 and B2), other cells are moved relative to their initial address (e.g., initial cell B1 is located at new address A2 after transposition, initial cell C2 is located at new address B3 after transposition, and so forth). Thus, formulas referencing cells of the original table 102 may no longer reference the intended cells after transposition of the table.

Based on this transpose operation, the algorithm 160 makes a determination (decision block 174) whether a formula 180 is to be updated or otherwise rewritten. In this example, the formula 180 may include arguments that reference one or more cells of the table 102 which was transposed to generate the transposed table 170. As discussed in greater detail below, the determination whether the formula 180 is to be updated may be based, in some implementations, on the type of function in question that is being implemented using the formula.

In the depicted flow diagram, in the event that the formula 180 is updated (block 184), the formula 180 may be rewritten in various ways to account for the transpose operation. For example, where appropriate, the formula 180 may be rewritten so as to reference the new position or address of the referenced cells (i.e., cells and cells ranges referenced in formulas may also be "rotated" in response to the transposition of the table). Such an update may involve referencing the cells in question by their new address after the transpose operation or may involve swapping arguments for formulas 180 that include arguments specifying one or both of rows and columns. Similarly, in some instances, the formula may be rewritten to correspond to a different function. For example, a column specific operation or formula may be rewritten to be a corresponding row specific operation or formula in response to the transpose operation. In the depicted example, the output of the formula update step 184 is an updated formula 186.

In some embodiments, the process flow may terminate (block 190) after the relevant formulas 180 have been updated at step 184. However, in the depicted example, an additional operation may be performed. In this example, an additional determination (decision block 194) may be made as to whether a notification 200 (e.g., a warning) will be displayed (block 202) proximate to cells 110 containing formulas. By way of example, two different types of notifications may be provided. For example, a notification 200 may be provided to place a user on notice that a formula 180 was not updated or rewritten after the transpose operation, and thus may be incorrect due to the results of the transpose operation. Alternatively, a notification 200 may be provided to place a user on notice that a formula 180 was updated or rewritten after the transpose operation, and thus may no longer correspond to the formula as originally entered by the user.

With the preceding discussion in mind, examples of various functions that might benefit from the above approach are discussed in greater detail. It should be appreciated that the following examples of suitable functions and corresponding formulas are provided merely to facilitate explanation and do not constitute an exhaustive, complete, or limiting list of the functions that may be updated as discussed herein. In the following examples, the respective formulas under discussion may have one or more defined arguments (denoted "<arg>" herein) that are respective variables used to define or determine the value of the function. As will be appreciated, in the present context the respective function arguments <arg> may references one or more cells of the original or transposed table.

In a first example, a row function (e.g., ROW (<arg>)) or a column function (e.g., COLUMN (<arg>)) may be present. By way of example, a ROW function or a COLUMN function may be provided an argument that references a cell or a range of cells. The ROW or COLUMN function then may return the corresponding row or column number(s), respectively, of the referenced cell(s). In this example, a ROW function that references a cell or cells within the transposed table 170 may be updated to a COLUMN function at step 180. Similarly, a COLUMN function that references a cell or cells within the transposed table 170 may be updated to a ROW function at step 180. That is, in this example, ROW or COLUMN functions and their respective arguments may be rewritten to reflect the rotated (i.e., transposed) nature of the transposed table 170.

In a second example, a horizontal lookup function (e.g., HLOOKUP ( . . . )) or a vertical lookup function (e.g., VLOOKUP( . . . )) may be present. Such functions may include a number of arguments including a value to being looked for, a table or range of cells to be searched (with the HLOOKUP function searching for the value in the first row and the VLOOKUP function searching for the value in the first column), and a row or column number, respectively, that a corresponding value is to be returned from once the value determines the respective column or row.

In this example, if an HLOOKUP function argument references a transposed table 170 to be searched, the HLOOKUP function may be updated or rewritten as a VLOOKUP function at step 180 with corresponding changes to the arguments. Similarly, a VLOOKUP function that references the transposed table 170 may be updated to a HLOOKUP function at step 180 with corresponding changes to the arguments. That is, in this example, HLOOKUP or VLOOKUP formulas and their respective arguments may rewritten to reflect the rotated (i.e., transposed) nature of the transposed table 170.

In a third example, an index function may be present which may include multiple arguments, including references to multiple tables. An example of such an index function may return a reference to one or more cell for rows or columns specified by the provided arguments. The index function arguments may specify one or more tables or a range of cells within one or more tables, a row number and a column number. For example, one such function may be denoted INDEX (<arg1>, <arg2>, <arg3>), where <arg1> specifies (i.e., references) one or more tables or ranges of cells within such tables, and <arg2> and <arg3> specify a row and column within the table(s) or cell range specified by <arg1>.

In this example, if <arg1> references only the transposed table 170 or cells within the transposed table 170, the update step 184 may swap the second and third arguments (<arg2>, <arg3>) such that the updated INDEX function reads: INDEX (<arg1>, <arg3>, <arg2>), effectively swapping the row and column references to reflect the rotation of the table 102.

If, however, <arg1> references not only the transposed table 170 but other tables as well, the INDEX function may instead be updated or rewritten at step 184 to include a TRANSPOSE( ) call that calls the relevant portions of the argument corresponding to the referenced cells located within the transposed table 170. In this manner, the INDEX function may be updated so as to selectively modify references to cells within the transposed table 170, but to remain unchanged with respect to those cells that are not within a transposed table.

Similarly, in certain contexts other types of formulas may be updated or rewritten at step 184 to incorporate a TRANSPOSE( ) call within the primary function to allow selective transposition of the referenced cells within a function argument. Other example of formulas where this may be an appropriate update at step 184 include, but are not limited to, SUMIF( ), AVERAGEIF( ), SUMIFS( ), AVERAGEIFS( ), and COUNTIFS( ) type functions, all of which may include one or more arguments having mixed ranges. That is, such functions may include arguments that can reference both a transposed table or range in conjunction with a table or range that has not been transposed. Thus, in each of these example, the update step 184 may rewrite the underlying or primary function to incorporate a TRANSPOSE( ) call to the transposed table 170 or cells which are referenced by the arguments of the underlying function.

In a similar example, an offset function may be present which may include multiple arguments, including references to a transposed table 170. An example of such an offset function may return a reference to a range of cells that is a specified number of rows and columns from an initially provided range of cells. For example, in one embodiment an offset function may be provided in the form OFFSET (<arg1>, <arg2>, <arg3>, <arg4>, <arg5>), where <arg1> provides the reference cell or cells to which the offset will be applied, <arg2> and <arg3> reference the number of rows and columns to be offset from the reference cell or cells, and <arg4> and <arg5>, if present, specify any changes to the height and width of the returned cell(s) if there is to be a difference in the dimensions of referenced cell(s) and the returned cell(s).

In this example, if <arg1> references a transposed table 170, the update step 184 may swap the second and third arguments (<arg2>, <arg3>) and the fourth and fifth arguments (<arg4>, <arg5>), if present, such that the updated OFFSET function reads: OFFSET (<arg1>, <arg3>, <arg2>, <arg5>, <arg4>), effectively swapping the row and column references and the height and width instructions to reflect the rotation of the table 102.

It should be appreciated that updating of a given formula defining a function in response to a transpose operation may be performed in other contexts as well as those described above. For instance, an example of such context includes, but is not limited to, situations where a table 102 includes "non-body" type cells that may be spanned by a range referenced by a formula, but which may not be relevant after a transpose operation.

An example of this may be instances where the table 102 includes a footer row 210 (as shown in FIG. 5) which may be distinct from the main body cells of the table in terms of usage by the application and user. Other examples of non-body type cells in the table 102 may include column headers, row headers, and so forth, where the application allots special significance to the use or values input to these cells. In the case of the footer row 210, however, an instance may arise where a column or column range referenced by a function of interest (e.g., a range referencing columns A-C, such as SUM(A:C) spans the footer row 210 of a table 102. In such instances, the referenced columns may intrinsically exclude cells in the footer row 210 (or other non-body cells) from the performance of the function.

Upon transposition of the table 102, the respective referenced cells of the footer row would no longer be within a footer row 210, but would instead be within a main body column 106 of the transposed table 170. In such an instance, the formula in question may be rewritten to exclude from the reference range those cells which were previously within the footer row 210, as such cells may not have contained meaningful user data. Thus, upon transposition of the referenced table, the formula 180 may be updated to only reference the same main body cells of the table as before, with non-body cells, such as footer row cells being written out or excluded from the updated formula 186.

The preceding examples relate to functions that may benefit from being updated in the event a referenced table is transposed. In other instances it may be desirable to in display a notification or warning proximate to the formula cell to advise a user that the transposition occurred and that the respective formula may, therefore, be inaccurate. For example, it may be desirable to instead display a notification in instances where it is difficult to ascertain the user's intent with respect to the formula and the transpose and where, therefore, updating the formula 180 is as likely or more likely to frustrate the user's intent as to advance it.

By way of example, a lookup function may be present which may include arguments referencing a transposed table 170. An example of such a lookup function (i.e., LOOKUP( )) may search for a specified value within a specified range and return a corresponding value from a second range. In such an example, if the LOOKUP ( ) function refers to a transposed table 170, a notification may be displayed at the cell containing the LOOKUP function to advise a user of the change to the referenced table.

In one embodiment, the notification logic may be extended so as to exclude unnecessary notifications. For example, in the event that the LOOKUP function references a square range within the table 102, the notification control logic may cause the display of a notification in the event that the table 102 is transposed to generate transposed table 170 due to the lookup function being defined to first process the major axis. Thus, for a square range, the processing order may not change, which could lead to the wrong result. Conversely, in such an embodiment, if the referenced range of cells is not square, the notification will not be displayed as the processing order will change with the transposition and, thus, no notification may be deemed necessary.

Similarly, other functions, such as the ADDRESS( ) function (which returns a reference for a specified row and column) and the INDIRECT( ) function (which returns a reference to cell or range of cells represented by a specified text string) may benefit from having a posted notification adjacent the function, as opposed to attempting to update or rewrite the formula in question.

Figure 7:
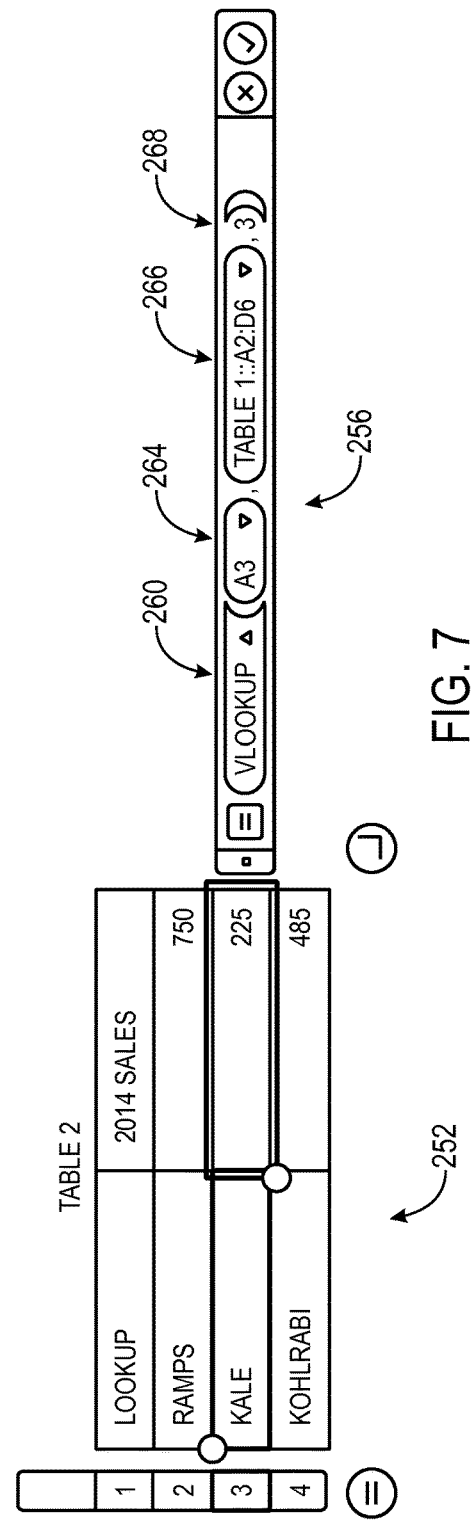
FIG. 7 depicts an example of a pair of tables, one of which includes a formula referencing cells in the other table, in accordance with aspects of the present disclosure.

With the preceding discussion in mind, and turning to FIGS. 7-11, a series of examples with corresponding screen views are provided. Turning to FIG. 7, in a first example, two tables (first table 250 and second table 252) are depicted on an application canvas, with the first table 250 containing a set of data values corresponding to year and product type and the second table 252 containing one or more formulas 180 that reference values present in the first table 250.

In FIG. 7, an editing window 256 is also provided showing the formula 180 entered into cell B3 of the second table 252. In the depicted example, the formula 180 is a VLOOKUP function 260 specifying three arguments: a value 264 to be searched for, a range 266 to be searched; and the column number 268 (i.e., "3") within the range for which a value will be returned. Thus, in the depicted example of FIG. 7, the VLOOKUP function specifies a first argument corresponding to the value (here "Kale") found in cell A3 of the table having the function (i.e., second table 252), specifies a second argument corresponding to the range to be searched as being cells A2 through D6 of the first table 250, and specifies a third argument of "3" corresponding to the third column (i.e., the column headed "2014"), from which a value will be returned. Thus, when executed, the depicted function will search for the value "Kale" (i.e., the value specified in cell A3 of the second table 252) within the first column (i.e., column A) of the specified range (i.e., cells A2 through D6 of Table 1). When the specified value is found in the specified range, the value (i.e., "225") will be returned that is in the third column relative to the specified value.

Figure 8:
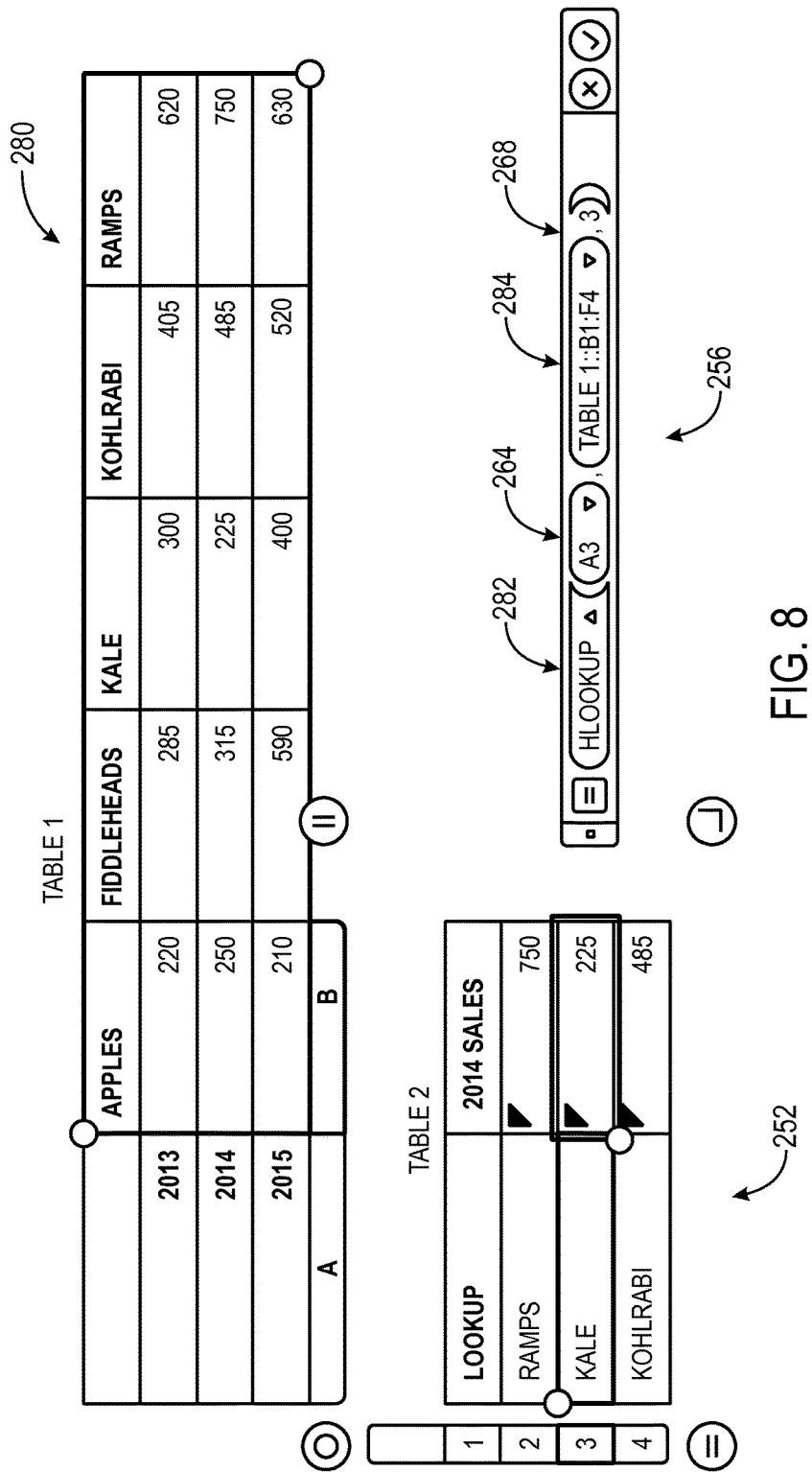
FIG. 8 depicts an update to the formula of FIG. 7 in response to the transposition of a table, in accordance with aspects of the present disclosure.

Turning to FIG. 8, in this figure first table 250 of FIG. 7 has been transposed to generate a transposed table 280. Thus, in this example, the columns and rows of first table have been interchanged (i.e., row 1 of table 250 is now column A of transposed table 280, and so forth). As a result of this transposition, the VLOOKUP function discussed with respect to FIG. 7 is now no longer correct and, in some instances, may reference cells by addresses that no longer exist. That is, the second argument of the formula, which referenced the first table 250, is no longer correct. In this example, therefore, the described function present in the second table 252 maybe updated by rewriting this function to account for the transposition of the first table 250 into transposed table 280.

With this in mind, the respective VLOOKUP function of FIG. 7 is rewritten as an HLOOKUP function 282 by control logic as discussed herein and as shown in editing window 256 of FIG. 8. In this example, the first and third arguments remain unchanged due to the transpose operation not impacting these parameters. However, the second argument is rewritten to reflect the rotated nature of the transposed table 280 relative to the first table 250. In particular, the updated second argument 284 of the HLOOKUP function now references the transposed table 280, but the referenced range of cells has been rewritten to cover cells B1 to F4, which corresponds to the initial range of cells after transposition.

Thus, as updated, the HLOOKUP function specifies a first argument corresponding to the value (here "Kale") found in cell A3 of the second table 252, specifies a second argument corresponding to the range to be searched as being cells B1 through F4 of the transposed table 280, and specifies a third argument of "3" corresponding to the third row (i.e., the row headed "2014"), from which a value will be returned. Thus, when executed, the depicted function will search for the value "Kale" (i.e., the value specified in cell A3 of the second table 252) within the first row (i.e., row 1) of the specified range (i.e., cells A2 through D6 of Table 1). When the specified value is found in the specified range, the value (i.e., "225") will be returned that is in the third row relative to the specified value.

Figure 9:
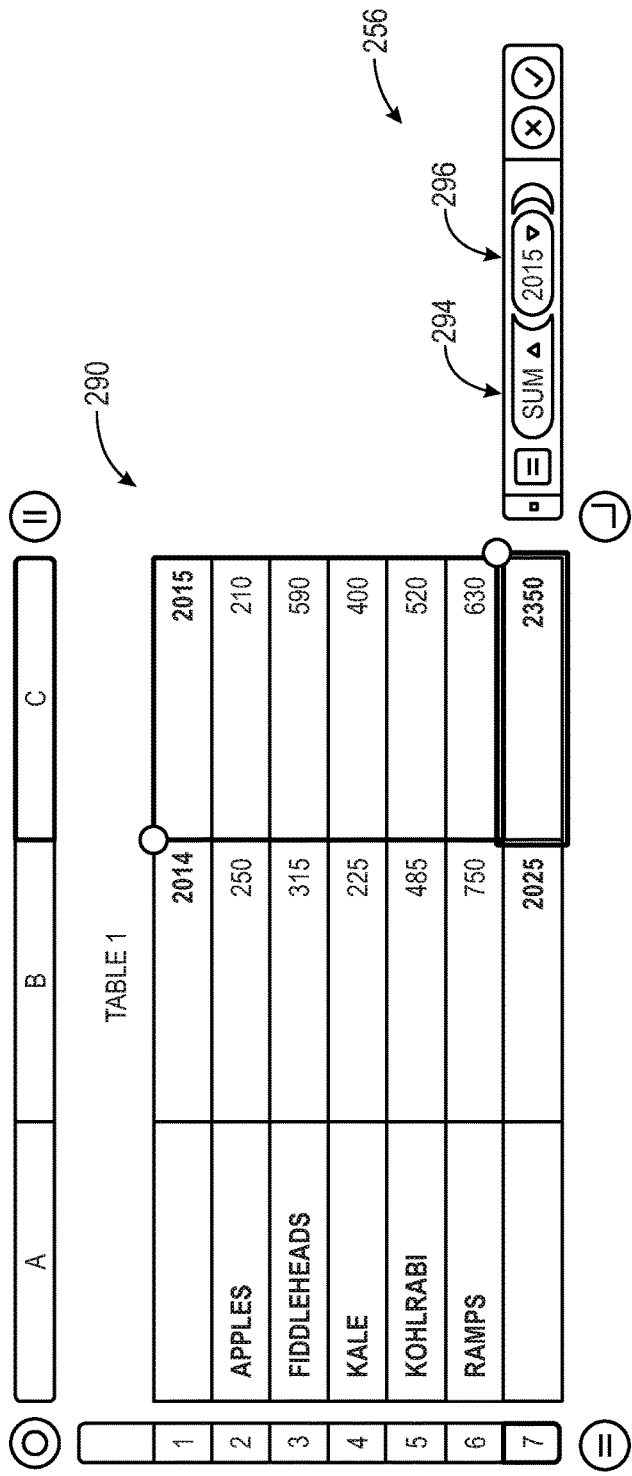
FIG. 9 depicts an example of a table, a cell of which includes a formula referencing cells in the table, in accordance with aspects of the present disclosure.
Figure 10:
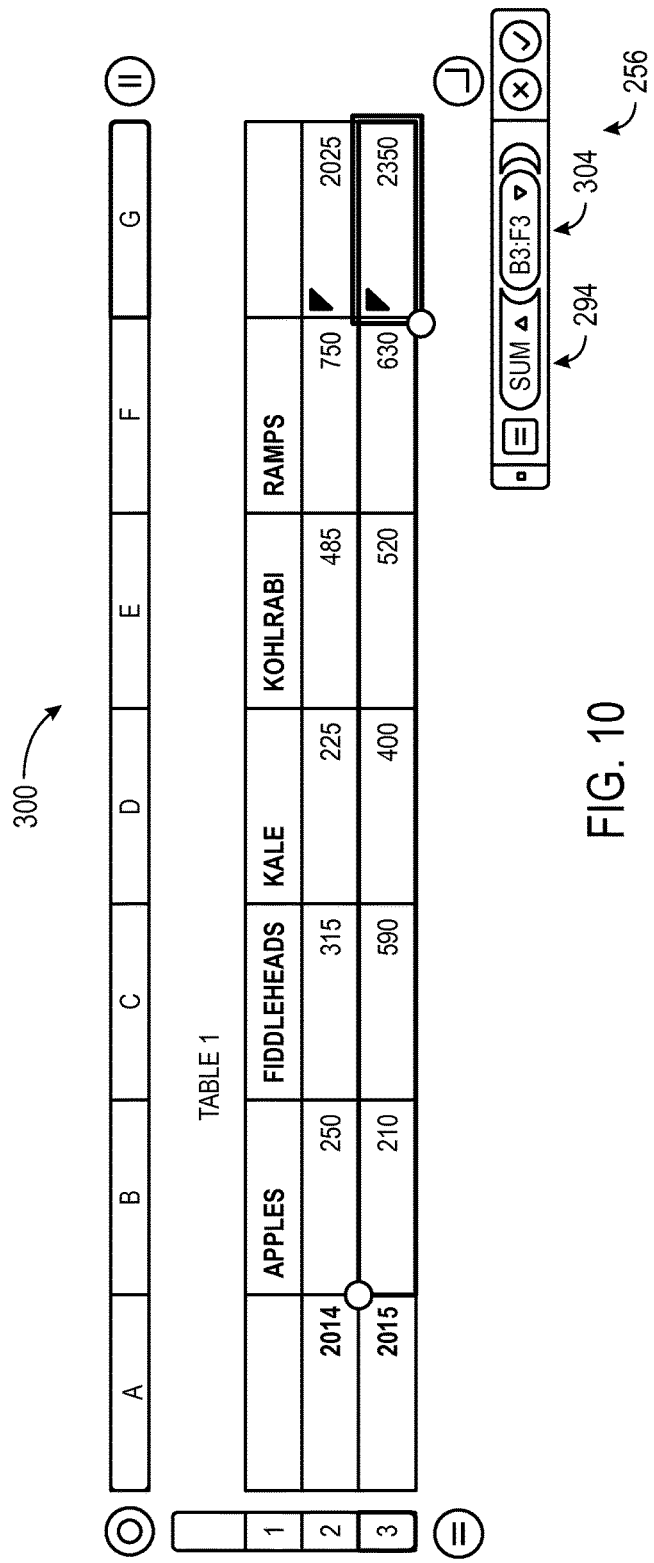
FIG. 10 depicts an update to the formula of FIG. 9 in response to the transposition of the table, in accordance with aspects of the present disclosure.

Turning to FIGS. 9-11, an additional example is described. In this example, a table 290 is initially provided (FIG. 9) that contains a set of data values corresponding to year and product type. The footer cell of column C (i.e., cell C7) includes a function 180 that reference values present in the table 290.

In particular, as shown in editing window 256, the provided function 180 is a SUM function 294 specifying a single argument: a column 296 (i.e., column C, headed "2015") in which the table body cells are to be summed In the depicted example, the output of the function ("2350") is shown in footer cell C7.

Turning to FIG. 10, in this example the table 290 has been transposed, generating transposed table 300. In the initial table 290, a footer row cell (i.e., cell C7) was encompassed within the region specified to be summed in column C, but was excluded from the SUM operation by virtue of being a footer cell, not a table body cell. Upon transposition of the table 290, however, this is no longer true and the previous footer row cell C7 containing the SUM function is now a table body cell G3 within the last column of the transposed table 300. Nevertheless, in this example, the control logic recognizes that the footer row cells of the original table 290 were not intended to be included in the referenced range of the SUM function. Hence, the control logic updates the SUM function upon transposition of table 290 to have an argument that references the updated range of cells (304) B3 to F3 of the transposed table 300, thereby excluding the cells of column G which previously corresponded to the cells of footer row 7.

Turning to FIG. 11, in this example a notification 310 is displayed to place a user on notice that the formula within cell G3 was updated in response to a table transpose operation. In addition, in this example the notification 310 provides an indication of the original formula. In this manner, the user is placed on notice of the change to the formula and may make changes to the formula if needed, such as in the event the update to the formula was incorrect or undesired.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A processor-implemented method for rewriting formulas, comprising:

upon receiving a transpose instruction, transposing an initial table comprising one or more initial cells within a computer application to generate a transformed table comprising one or more transposed cells;

evaluating one or more initial formulas for arguments referencing the initial table;

if arguments referencing the initial table are present in the one or more initial formulas, rewriting the one or more initial formulas to generate one or more updated formulas that reference the one or more transposed cells within the transposed table, wherein rewriting the one or more initial formulas comprises swapping a function type of the initial formula with a different function type, such that results of the one or more updated formulas match results of the one or more initial formulas.

2. The processor-implemented method of claim 1, wherein the entire initial table is transposed in response to the transpose instruction.

3. The processor-implemented method of claim 1, wherein the one or more initial formulas are located in the table or in a separate table.

4. The processor-implemented method of claim 1, wherein the one or more transposed cells do not include cells previously located in a footer row of the initial table that are located within a column of the transposed table.

5. The processor-implemented method of claim 1, further comprising:
   displaying a change notification that a respective initial formula was rewritten.

6. The processor-implemented method of claim 1, further comprising:
   displaying a different notification that a respective initial formula was not rewritten.

7. At least one non-transitory, tangible computer-readable medium encoding processor-executable routines, wherein the routines, when executed by at least one processor cause acts to be performed comprising:
   transposing an initial table comprising one or more initial cells displayed on an application canvas to generate a transformed table comprising one or more transposed cells in response to a transpose command;
   displaying a change notification proximate to one or more updated formulas that were updated in response to the table transposition, wherein the one or more updated formulas reference the one or more transposed cells, and wherein the one or more updated formulas comprise swapping a function type of an initial formula with a different function type, such that results of the one or more updated formulas match results of the initial formula; and
   displaying a notification proximate to one or more initial formulas that were not updated in response to the table transposition, wherein the one or more initial formulas reference the one or more initial cells.

8. The non-transitory, tangible computer-readable medium of claim 7, wherein the one or more updated formulas include arguments referencing the one or more transposed cells of the table.

9. The non-transitory, tangible computer-readable medium of claim 7, wherein the routines, when executed by the processor, cause further acts to be performed comprising:
   updating the one or more initial formulas referencing the initial one or more cells in response to the table transposition.

10. The non-transitory, tangible computer-readable medium of claim 7, wherein the change notification informs a user that the one or more updated formulas were updated in response to the transposition of the initial table.

11. The non-transitory, tangible computer-readable medium of claim 7, wherein the change notification includes an indication of formula references to the initial table prior to the transposition.

12. The non-transitory, tangible computer-readable medium of claim 7, wherein the notification informs a user that the one or more initial formulas were not updated in response to the transposition of the initial table.

13. A processor-based system, comprising:
   a display;
   at least one memory to store one or more routines; and
   at least one processing component configured to execute the one or more routines stored in the memory, wherein the one or more routines, when executed by the at least one processing component, cause the at least one processing component to:
      display an initial table object on a canvas of a spreadsheet application, wherein the initial table object comprises a plurality of initial cells arranged in initial rows and initial columns;
      transpose the initial table object in response to a received input to generate a transposed table object comprising a plurality of transposed cells arranged in transposed rows and transposed columns, wherein transposing the initial table object comprises interchanging the initial rows and the initial columns of the initial table object to generate the transposed columns and the transposed rows;
      in response to the transposition of the initial table object, evaluate an initial formula for arguments referencing the initial table object;
      based on the evaluation, rewrite the initial formula comprising an initial function type to generate an updated formula to perform the same with respect to the transposed table object as the initial formula performed with the initial table object, wherein the updated formula references the plurality of transposed cells, wherein the updated formula comprises a different function type than the initial function type, such that results of the updated formula match results of the initial formula; and
      based on the evaluation, display a notification proximate to the updated formula that conveys a status of the updated formula with respect to the transposition of the initial table object.

14. The processor-based system of claim 13, wherein the notification states that the initial formula was updated in view of the transposition of the initial table object.

15. The processor-based system of claim 13, wherein the notification states that the initial formula was not updated in view of the transposition of the initial table object.

16. The processor-based system of claim 13 wherein rewriting the initial formula comprises one or more of: swapping arguments within initial formula, redefining a referenced range of the plurality of initial cells, excluding footer cells from a referenced range, or inserting a transpose function call.

17. A processor-implemented method for rewriting formulas, comprising:
   identifying one or more arguments in an initial formula that reference one or more initial cells of an initial table in a spreadsheet application, wherein the initial table has been transposed to generate a transposed table comprising one or more transposed cells;
   updating the initial formula to generate an updated formula to maintain functionality of the initial formula after transposition of the initial table, wherein the updated formula references the one or more transposed cells, wherein updating the initial formulas comprises swapping a function type of the initial formula with a different function type, such that results of the updated formula match results of the initial formula; and
   displaying a notification regarding a status of the updated formula after transposition of the initial table.

18. The processor-implemented method of claim 17, wherein updating the initial formula comprises substituting a new formula having a second directional functionality in the transposed formula if the initial formula has a first directional functionality.

19. The processor-implemented method of claim 17, wherein updating the initial formula comprises swapping arguments within the initial formula where the arguments respectively reference rows and columns of the initial table.

20. The processor-implemented method of claim 17, wherein updating the initial formula comprises changing a range of cells referenced by an argument of the initial formula to correspond to the transposed position of one or more cells originally referenced in the initial table.

21. The processor-implemented method of claim 17, wherein updating the initial formula comprises inserting a transpose function call within the updated formula.

22. At least one non-transitory, tangible computer-readable medium encoding processor-executable routines, wherein the routines, when executed by at least one processor cause acts to be performed comprising:
receiving a transpose instruction and, in response, transposing an initial table comprising one or more initial cells displayed on an application canvas to generate a transformed table comprising one or more transposed cells;
for a first set of initial formulas that reference the one or more initial cells, updating each respective initial formula to generate an updated formula of a first set of updated formulas so as to maintain functionality of the initial formula after the initial table is transposed, wherein the first set of updated formulas reference the one or more transposed cells, wherein updating each respective initial formula comprises substituting the respective initial formula for a respective updated formula corresponding to a different function type, such that results of the respective updated formula match results of the respective initial formula; and
for a second set of initial formulas, displaying a first notification proximate to each respective initial formula indicating that the respective initial formula was not updated in response to the initial table being transposed.

23. The non-transitory, tangible computer-readable medium of claim 22, wherein the routines, when executed by the processor, cause further acts to be performed comprising:
displaying a second notification proximate to a respective updated formula indicating that the respective updated formula was updated in response to the initial table being transposed.

24. The non-transitory, tangible computer-readable medium of claim 22, wherein updating each respective initial formula comprises one or more of rewriting a referenced range of the one or more initial cells, swapping arguments within the respective initial formula, or inserting a transpose function call into the respective updated formula.

25. The non-transitory, tangible computer-readable medium of claim 22, wherein the entire initial table is transposed.

* * * * *